United States Patent [19]

Richardson et al.

[11] Patent Number: 5,903,773

[45] Date of Patent: *May 11, 1999

[54] SYSTEM TO IMPROVE TRAPPING OF I/O INSTRUCTIONS IN A PERIPHERAL COMPONENT INTERCONNECT BUS COMPUTER SYSTEM AND METHOD THEREFOR

[75] Inventors: Nicholas Julian Richardson, La Jolla, Calif.; Barry Davis, Phoenix; Gary Hicok, Mesa, both of Ariz.

[73] Assignee: VLSI Technology, Inc., San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/704,281

[22] Filed: Aug. 28, 1996

[51] Int. Cl.$^6$ ..................................................... G06F 11/30
[52] U.S. Cl. .......................... 395/839; 395/838; 395/837; 395/750.06
[58] Field of Search .................................. 395/838, 839, 395/837, 835, 750.06

[56] References Cited

U.S. PATENT DOCUMENTS

| | | | |
|---|---|---|---|
| 5,566,351 | 10/1996 | Crittenden et al. | 395/867 |
| 5,628,029 | 5/1997 | Evoy | 395/838 |
| 5,638,514 | 6/1997 | Yoshida et al. | 395/200.11 |
| 5,649,212 | 7/1997 | Kawamura et al. | 395/750 |
| 5,655,127 | 8/1997 | Rabe et al. | 395/750.04 |

*Primary Examiner*—Meng-Ai T. An
*Assistant Examiner*—Gautam R. Patel
*Attorney, Agent, or Firm*—Harry M. Weiss; Jeffrey D. Moy; Harry M. Weiss & Associates, P.C.

[57] ABSTRACT

A system for trapping I/O instructions. The system is comprised of at least one peripheral controller for receiving a plurality of I/O instructions and for initiating trapping of an un-executable I/O instruction by issuing a target abort signal when the peripheral controller senses a power off condition in a peripheral device. A system controller is coupled to the at least one peripheral controller for receiving the target abort signal from the at least one peripheral controller and for sequentially: issuing a system management interrupt (SMI) signal; counting a predetermined time period to allow recognition of the SMI signal; and issuing a cycle completion signal after counting the predetermined time period. A CPU is coupled to the system controller for issuing a plurality of I/O instructions and for receiving the SMI signal and the cycle completion signal from the system controller.

14 Claims, 2 Drawing Sheets

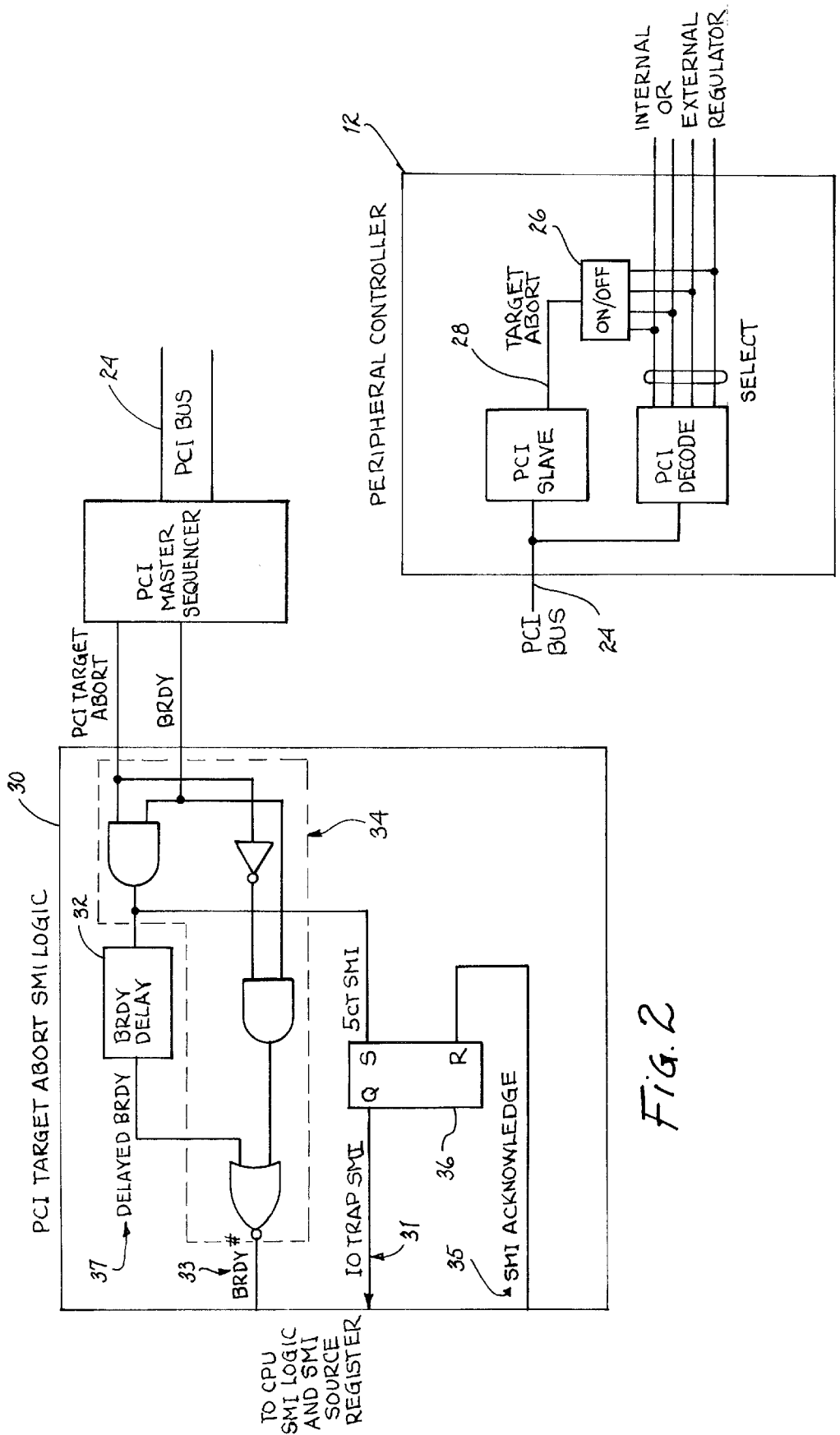

SYSTEM TO IMPROVE TRAPPING OF I/O INSTRUCTIONS IN A PERIPHERAL COMPONENT INTERCONNECT BUS COMPUTER SYSTEM AND METHOD THEREFOR

BACKGROUND OF THE INVENTION

1. Field of the Invention

This invention relates to computer systems and, more specifically, to a system and method which will allow any agent in a peripheral component interconnect (PCI) bus system to inform the CPU to PCI bus bridge that an input/output (I/O) instruction executed by the central processing unit (CPU) and targeted for the agent in question is to be trapped.

2. Description of the Prior Art

In the past, in order to trap I/O instructions issued by the CPU and destined for a device that is unable to respond, a centralized power and system management circuit detects the trappable I/O instructions by checking the I/O address of where the I/O instruction is to be sent to verify if the device in question was powered up or down. If the device was powered down, the power and system management circuit informed the system controller of this situation and asserted a system management interrupt (SMI) signal to the CPU before completion of the I/O instruction on the CPU bus. This centralized mechanism did not lend itself well to distributed power management systems because of the requirement to know in advance the devices to be used so the central power and system management circuit could be designed to monitor the power status of each device. This resulted in a large and complex centralized power and system management circuit. Therefore, there existed a need to provide an improved system for trapping I/O instructions and a method therefor.

SUMMARY OF THE INVENTION

It is an object of the present invention to provide an improved system and method for trapping I/O instructions.

It is another object of the present invention to provide an improved system and method for trapping I/O instructions that allows devices that are the target of the I/O instructions to trap the I/O instructions themselves by guaranteeing that the CPU to PCI Bus Bridge asserts a system management interrupt (SMI) signal to the CPU before the CPU to PCI Bus Bridge completes the trapped I/O instruction on the CPU bus.

It is still another object of the present invention to provide an improved system and method for trapping I/O instructions that allows for the trapping of I/O instructions in a hierarchal peripheral component interconnect (PCI) bus system.

It is still a further object of the present invention to provide an improved system and method for trapping I/O instructions that allows the trapping of I/O instructions by devices on a secondary PCI bus via a PCI to PCI bus bridge.

BRIEF DESCRIPTION OF THE PREFERRED EMBODIMENTS

In accordance with one embodiment of the present invention, a system for trapping I/O instructions is disclosed. The system is comprised of a plurality of elements one of which is at least one peripheral controller means. The peripheral controller means is used for receiving a plurality of I/O instructions and for initiating trapping of an un-executable I/O instruction by issuing a target abort signal when the at least one peripheral controller means senses a turned off condition. System controller means are coupled to the at least one peripheral controller means for receiving the target abort signal from the at least one peripheral controller means, for sequentially issuing an SMI signal after counting a predetermined time period to allow recognition of the SMI signal and for issuing a cycle completion signal after counting the predetermined time period. CPU means are coupled to the system controller means for issuing the plurality of I/O instructions and for receiving the SMI signal and the cycle completion signal from the system controller means. The system controller means is comprised of CPU bus to peripheral bus bridge means coupled to the CPU means for relaying all of the plurality of I/O instructions from the CPU means and for receiving the target abort signal issued by the at least one peripheral controller means; and Target Abort SMI Logic means coupled to the CPU bus to peripheral bus bridge means for receiving the target abort signal and thereupon transmitting the SMI signal to the CPU means. The at least one peripheral controller means is comprised of power status means coupled to a peripheral device means for informing the at least one peripheral controller means when the peripheral device means is turned off and unable to respond to one of the plurality of I/O instructions; and target abort generation means for generating the target abort signal when the power status means determines that the peripheral device means is turned off.

In accordance with another embodiment of the present invention, a method of providing a system for trapping I/O instructions is disclosed. The method comprises the steps of: providing at least one peripheral controller means for receiving a plurality of I/O instructions and for initiating trapping of an un-executable I/O instruction by issuing a target abort signal when the at least one peripheral controller senses an off condition; providing system controller means coupled to the at least one peripheral controller means for receiving the target abort signal from the at least one peripheral controller means, for sequentially issuing an SMI signal after counting a predetermined time period to allow recognition of the SMI signal and for issuing a cycle completion signal after counting the predetermined time period; and providing CPU means coupled to the system controller means for issuing the plurality of I/O instructions and for receiving the SMI signal and the cycle completion signal from the system controller means. The step of providing the system controller means further comprises the steps of: providing CPU bus to peripheral bus bridge means coupled to the CPU means for relaying all of the plurality of I/O instructions from the CPU means and for receiving the target abort signal issued by the at least one peripheral controller means; and providing Target Abort SMI Logic means coupled to the CPU bus to peripheral bus bridge means for receiving the target abort signal and thereupon transmitting the SMI signal to the CPU means. The step of providing the at least one peripheral controller means is further comprised of the steps of: providing power status means coupled to the peripheral device means for informing the at least one peripheral controller means when the peripheral device means is turned off and unable to respond to one of the plurality of I/O instructions; and providing target abort generation means coupled to the peripheral bus for generating the target abort signal when the power status means determines that the peripheral device means is turned off.

The foregoing and other objects, features, and advantages of the invention will be apparent from the following, more particular, description of the preferred embodiments of the invention, as illustrated in the accompanying drawings.

BRIEF DESCRIPTION OF THE DRAWINGS

FIG. 2 is a logic diagram of the PCI Target Abort SMI Logic block used in the system depicted in FIG. 1.

FIG. 3 is a functional block diagram of the peripheral controller used in the system depicted in FIG. 1.

DESCRIPTION OF THE PREFERRED EMBODIMENTS

Figure 1:
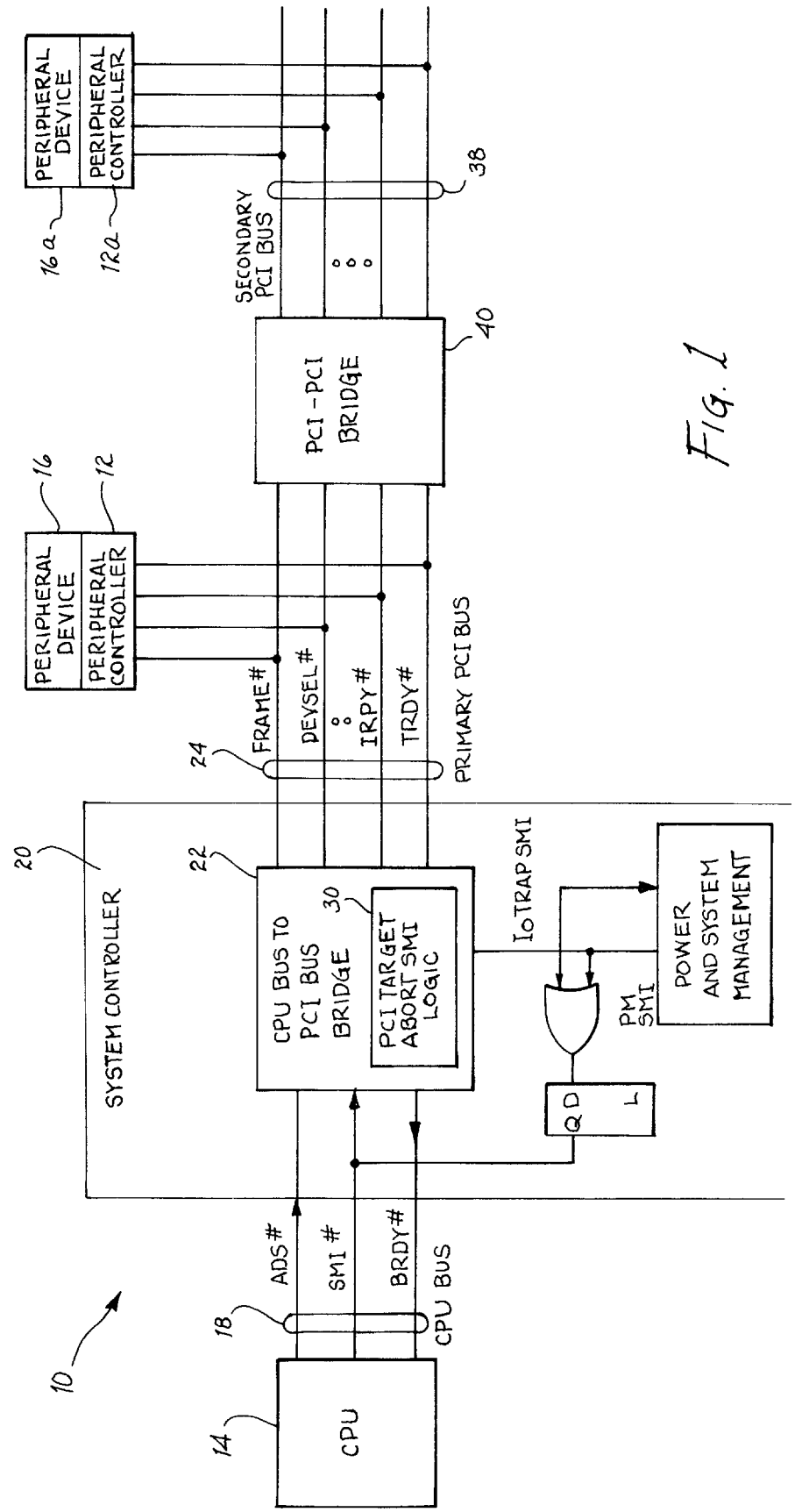
FIG. 1 is a functional block diagram of an improved system for trapping I/O instructions.

Referring to FIG. 1, an improved system for trapping I/O instructions 10 (hereinafter system 10) is shown. The system 10 allows any peripheral controller 12 to cause the trapping of an un-executable I/O instruction.

The system 10 is comprised of a plurality of elements one of which is the CPU 14. The CPU 14 issues I/O instructions for execution by a peripheral device 16. Peripheral devices 16 are well known in the art. Some examples of a peripheral device 16 include but is not limited to: a floppy disk drive, a hard disk drive, a tape drive, or a combination of these devices.

The CPU 14 is coupled to the CPU bus 18 which receives the issued I/O instructions from the CPU 14. The CPU bus 18 is coupled to the system controller 20 and the system controller 20 is further coupled to the primary PCI bus 24. The system controller 20 receives the I/O instructions from the CPU bus 18 and relays the I/O instructions to the primary PCI bus 24. The system controller 20 is comprised of the CPU bus to PCI bus bridge 22. The CPU bus to PCI bus bridge 22 functions as a mechanism to relay I/O instructions from the CPU bus 18 to the primary PCI bus 24. The primary PCI bus 24 has at least one peripheral controller 12 coupled to it. The peripheral controller 12 receives the I/O instructions from the primary PCI bus 24. The peripheral controller 12 is coupled to the peripheral device 16, and the I/O instructions are passed to the peripheral device 16 through the peripheral controller 12.

The system 10 may also be used with a PCI—PCI bridge 40. The PCI—PCI bridge 40 couples the primary PCI bus 24 to a secondary PCI bus 38. The secondary PCI bus 28 will have at least one secondary peripheral controller 12a coupled to it. The secondary peripheral controller 12a receives the I/O instructions from the primary PCI bus 24 via the PCI—PCI bridge 40 and the secondary PCI bus 38. The secondary peripheral controller 12a which is coupled to a secondary peripheral device 16a will then transfer the I/O instructions to the peripheral device 16a. The secondary peripheral controller 12a and the secondary peripheral device 16a are the same type of components as the peripheral controller 12 and the secondary peripheral device 16.

Referring to FIG. 3, the peripheral controller 12 is shown in more detail. The peripheral controller 12 is comprised of an ON/OFF detector 26. The ON/OFF detector 26 monitors the peripheral device 12 (shown in FIG. 1) and detects if the peripheral device 16 is in a power off condition. If the peripheral device 16 is in a power off condition the ON/OFF detector 26 will activate the target abort signal line 28 which will cause a target abort signal to be sent via the primary PCI bus 24.

Referring now to FIG. 2 the PCI target abort SMI logic block 30 is shown in detail. The PCI target abort SMI logic block 30 is comprised of a BRDY Delay 32 that is coupled to the primary PCI bus 24 and to the cycle completion logic circuit 34. The BRDY Delay 32 delays the issue of the cycle completion signal (BRDY signal in the preferred embodiment.) The cycle completion logic circuit 34 is coupled to the primary PCI bus 24 and receives the target abort signal sent by the peripheral controller 12 (FIG. 3). The cycle completion logic circuit 34 is also coupled to the CPU 14 (FIG. 1) and issues the cycle completion signal (BRDY signal in the preferred embodiment) to the CPU 14 (FIG. 1.) The PCI target abort SMI logic block 30 further comprises a flip-flop 36. The flip-flop 36 is coupled to the cycle completion logic circuit 34 and the CPU 14 (FIG. 1). The flip flop 36 asserts the SMI signal to the CPU 14 (FIG. 1) and also receives the SMI acknowledgment signal back from the CPU 14 (FIG. 1.)

OPERATION

The CPU 14 issues a plurality of I/O instructions that are relayed to the peripheral device 16 or the secondary peripheral device 16a for execution. All I/O instructions travel via the CPU bus 18, the CPU to PCI bus bridge 32, the primary PCI bus 24 and the peripheral controller 12.

I/O instructions targeting a secondary peripheral device 16a are also sent via the PCI—PCI bridge 40 and the secondary PCI bus 38. All operations of the secondary peripheral controller 12a are identical to the peripheral controller 12 and may be understood from the following description.

The peripheral controller 12 receives the I/O instruction for the peripheral device 16. The ON/OFF detector 26 checks the power status of the peripheral device 16. If the peripheral device 16 is powered up, the I/O instruction is relayed to the peripheral device 16 and executed. However, if the peripheral device 16 is powered down, the peripheral device 16 will be unable to respond to the I/O instruction and the I/O instruction becomes an un-executable I/O instruction. The ON/OFF detector 26 will sense a powered down condition and will activate the target abort signal line 28 causing a target abort signal to be transmitted. The target abort signal is relayed back to the system controller 20 and thence to the PCI target abort SMI logic block 30. The target abort signal is received by the flip flop 36 which immediately asserts an SMI signal to the CPU 14 (shown as IO trap SMI 31). After the CPU 14 recognizes the SMI signal, an SMI acknowledge signal 35 will be transmitted to the flip flop 36 allowing the reset of the flip flop 36. At the same time the target abort signal arrives at the PCI target abort SMI logic block 30, the cycle completion logic circuit 34 and the BRDY Delay 32 also receive the target abort signal. The BRDY Delay 32 commences counting a predetermined time period which allows the CPU 14 to recognize the SMI signal sent to it by the flip flop 36. At the expiration of the predetermined time period, the BRDY Delay 32 transmits a delayed BRDY signal 37 to the cycle completion logic circuit 34. The combination of the target abort signal and the delayed BRDY signal 37 will enable the cycle completion logic circuit 34 to issue a cycle completion signal (shown as BRDY#33) to the CPU 14. The CPU 14 now recognizes that an un-executable I/O instruction has been trapped, and the cycle initiated by its generation of the un-executable I/O instruction is complete. The CPU 14 will then proceed as its normal programming directs.

Although the invention has been particularly shown and described with reference to a preferred embodiment thereof, it will be understood by those skilled in the art that changes in form and detail may be made therein without departing from the spirit and scope of the invention.

What is claimed is:

1. A system for trapping I/O instructions, comprising, in combination:

at least one peripheral controller means for receiving a plurality of I/O instructions and for initiating trapping of an un-executable I/O instruction by issuing a target abort signal when said at least one peripheral controller senses an off condition;

system controller means coupled to said at least one peripheral controller means for receiving said target abort signal from said at least one peripheral controller means, for sequentially issuing a system management interrupt (SMI) signal after counting a predetermined time period to allow recognition of said SMI signal and for issuing a cycle completion signal after counting said predetermined time period;

CPU means coupled to said system controller means for issuing said plurality of I/O instructions and for receiving said SMI signal and said cycle completion signal from said system controller means;

CPU bus means coupled to said CPU means and to said system controller means for relaying of said plurality of I/O instructions from said CPU means to said system controller means and for sending said SMI signal from said system controller means to said CPU means; and peripheral bus means coupled to said system controller means and to said at least one peripheral controller means for relaying said plurality of I/O instructions from said system controller means to said at least one peripheral controller means and for sending said target abort signal from said at least one peripheral controller means to said system controller means;

said system controller means comprises:

CPU bus to peripheral bus bridge means coupled to said CPU bus means and to said peripheral bus means for relaying all of said plurality of I/O instructions from said CPU bus means to said peripheral bus means and for receiving said target abort signal issued by said at least one peripheral controller means and transmitted via said peripheral bus means; and Target Abort SMI Logic means coupled to said CPU bus to peripheral bus bridge means for receiving said target abort signal and thereupon transmitting said SMI signal to said CPU bus means, wherein said Target Abort SMI Logic means comprises:

delay means coupled to said peripheral bus means for receiving said target abort signal and for delaying assertion of said cycle completion signal for said predetermined time period;

logic means coupled to said delay means for receiving said target abort signal and for asserting said cycle completion signal to said CPU means after said delay means waits said predetermined time period; and flip-flop means coupled to said logic means and said CPU means for asserting said SMI signal to said CPU means and for receiving a SMI signal acknowledgment when said CPU means acknowledges said SMI signal.

2. The system of claim 1 wherein said peripheral bus means is a peripheral component interconnect (PCI) bus.

3. The system of claim 1 further comprising peripheral device means coupled to said at least one peripheral controller means for receiving and acting upon said plurality of I/O instructions received from said at least one peripheral controller means.

4. The system of claim 3 wherein said at least one peripheral controller means comprises:

power status means coupled to said peripheral device means for informing said at least one peripheral controller means when said peripheral device means is turned off and unable to respond to one of said plurality of I/O instructions which is said un-executable I/O instruction; and target abort generation means coupled to said peripheral bus for generating said target abort signal when said power status means determines that said peripheral device means is turned off.

5. The system or claim 1 further comprising;

a secondary peripheral bus;

at least one secondary peripheral controller means coupled to said secondary peripheral bus for receiving a plurality of secondary I/O instructions from said CPU means and for initiating trapping of an un-executable secondary I/O instruction by issuing a secondary target abort signal when said at least one secondary peripheral controller senses an off condition; and PCI—PCI Bridge means coupled to said peripheral bus means and to said secondary peripheral bus for transferring information from said at least one secondary peripheral controller means to said system controller means.

6. The system of claim 5 further comprising secondary peripheral device means coupled to said at least one secondary peripheral controller means for receiving and acting upon said plurality of secondary I/O instructions received from said at least one secondary peripheral controller means.

7. The system of claim 6 wherein said at least one secondary peripheral controller means comprises:

power status means coupled to said secondary peripheral device means for informing said at least one secondary peripheral controller means when said secondary peripheral device means is turned off and unable to respond to one of said plurality of secondary I/O instructions which is said un-executable secondary I/O instruction; and secondary target abort generation means coupled to said secondary peripheral bus for generating said secondary target abort signal when said power status means determines that said secondary peripheral device means is turned off.

8. A method of providing a system for trapping I/O instructions comprising the steps of:

providing at least one peripheral controller means for receiving a plurality of I/O instructions and for initiating trapping of an un-executable I/O instruction by issuing a target abort signal when said at least one peripheral controller senses an off condition;

providing system controller means coupled to said at least one peripheral controller means for receiving said target abort signal from said at least one peripheral controller means, for sequentially issuing a system management interrupt (SMI) signal after counting a predetermined time period to allow recognition of said SMI signal and for issuing a cycle completion signal after counting said predetermined time period;

providing CPU means coupled to said system controller means for issuing said plurality of I/O instructions and for receiving said SMI signal and said cycle completion signal from said system controller means;

providing CPU bus means coupled to said CPU means and to said system controller means for relaying of said plurality of I/O instructions from said CPU means to said system controller means and for sending said SMI signal from said system controller means to said CPU means; and providing peripheral bus means coupled to said system controller means and to said at least one peripheral controller means for relaying said plurality of I/O instructions from said system controller means to said at least one peripheral controller means and for sending said target abort signal from said at least one peripheral controller means to said system controller means;

said step of providing system controller means further comprising the steps of:

providing CPU bus to peripheral bus bridge means coupled to said CPU bus means and to said peripheral bus means for relaying all of said plurality of I/O instructions from said CPU bus means to said peripheral bus means and for receiving said target abort signal issued by said at least one peripheral controller means and transmitted via said peripheral bus means; and providing Target Abort SMI Logic means coupled to said CPU bus to peripheral bus bridge means for receiving said target abort signal and thereupon transmitting said SMI signal to said CPU bus means, wherein said step of providing Target Abort SMI Logic means further comprises the steps of:

providing delay means coupled to said peripheral bus means for receiving said target abort signal and for delaying assertion of said cycle completion signal for said predetermined time period;

providing logic means coupled to said delay means for receiving said target abort signal and for asserting said cycle completion signal to said CPU means after said delay means waits said predetermined time period; and providing flip-flop means coupled to said logic means and said CPU means for asserting said SMI signal to said CPU means and for receiving a SMI signal acknowledgment when said CPU means acknowledges said SMI signal.

9. The method of claim 8 wherein said step of providing peripheral bus means further comprises the step of providing a peripheral component interconnect (PCI) bus.

10. The method of claim 8 further comprising the step of providing peripheral device means coupled to said at least one peripheral controller means for receiving and acting upon said plurality of I/O instructions received from said at least one peripheral controller means.

11. The method of claim 10 wherein said step of providing at least one peripheral controller means further comprises the steps of:

providing power status means coupled to said peripheral device means for informing said at least one peripheral controller means when said peripheral device means is turned off and unable to respond to one of said plurality of I/O instructions which is said un-executable I/O instruction; and providing target abort generation means coupled to said peripheral bus for generating said target abort signal when said power status means determines that said peripheral device means is turned off.

12. The method of claim 8 further comprising the steps of providing a secondary peripheral bus;

providing at least one secondary peripheral controller means coupled to said secondary peripheral bus for receiving a plurality of secondary I/O instructions from said CPU means and for initiating trapping of an un-executable secondary I/O instruction by issuing a secondary target abort signal when said at least one secondary peripheral controller senses an off condition; and providing PCI—PCI Bridge means coupled to said peripheral bus means and to said secondary peripheral bus for transferring information from said at least one secondary peripheral controller means to said system controller means.

13. The method of claim 12 further comprising the step of providing secondary peripheral device means coupled to said at least one secondary peripheral controller means for receiving and acting upon said plurality of secondary I/O instructions received from said at least one secondary peripheral controller means.

14. The method of claim 13 wherein said step of providing at least one secondary peripheral controller means further comprises the steps of:

providing power status means coupled to said secondary peripheral device means for informing said at least one secondary peripheral controller means when said secondary peripheral device means is turned off and unable to respond to one of said plurality of secondary I/O instructions which is said un-executable secondary I/O instruction; and providing secondary target abort generation means coupled to said secondary peripheral bus for generating said secondary target abort signal when said power status means determines that said secondary peripheral device means is turned off.

* * * * *